United States Patent
Fan

(10) Patent No.: US 12,505,182 B2
(45) Date of Patent: Dec. 23, 2025

(54) OBFUSCATED CODE ENCRYPTION METHOD AND APPARATUS, AND DEVICE AND READABLE STORAGE

(71) Applicant: SUZHOU METABRAIN INTELLIGENT TECHNOLOGY CO., LTD., Jiangsu (CN)

(72) Inventor: Yi Fan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 161 days.

(21) Appl. No.: 18/563,372

(22) PCT Filed: Feb. 28, 2022

(86) PCT No.: PCT/CN2022/078323
§ 371 (c)(1),
(2) Date: Nov. 21, 2023

(87) PCT Pub. No.: WO2023/045249
PCT Pub. Date: Mar. 30, 2023

(65) Prior Publication Data
US 2025/0245301 A1     Jul. 31, 2025

(30) Foreign Application Priority Data
Sep. 23, 2021    (CN) .......................... 202111116879.2

(51) Int. Cl.
*G06F 21/14* (2013.01)
*G06F 21/60* (2013.01)

(52) U.S. Cl.
CPC ............ *G06F 21/14* (2013.01); *G06F 21/602* (2013.01)

(58) Field of Classification Search
CPC . G06F 21/14; G06F 21/602; G06F 2221/2107
See application file for complete search history.

(56) References Cited

U.S. PATENT DOCUMENTS

| | | | |
|---|---|---|---|
| 8,510,756 B1* | 8/2013 | Koryakin | G06F 9/45558 718/1 |
| 2009/0049425 A1* | 2/2009 | Liepert | G06F 21/14 717/110 |
| 2018/0307837 A1* | 10/2018 | Ahn | G06F 21/14 |

FOREIGN PATENT DOCUMENTS

| CN | 103699820 A | 4/2014 |
|---|---|---|
| CN | 107292135 A | 10/2017 |

(Continued)

*Primary Examiner* — Sangseok Park
(74) *Attorney, Agent, or Firm* — IPro, PLLC

(57) ABSTRACT

The present application discloses a method for encryption of obfuscation code, an apparatus, a device and a readable medium. The method for encryption of obfuscation code includes: obtaining position information of all of function codes in a to-be-encrypted program; based on the position information, determining, one by one, whether a skipping instruction exists in the corresponding function code; when a skipping instruction exists in one of the function codes, saving the skipping instruction and corresponding address information into a decryption datum body, and replacing the skipping instruction with a breakpoint instruction; and in response to execution of the preceding one step being completed for all of the function codes, based on the decryption datum body and an encrypted program obtained by replacing the instructions, generating an encrypted file.

20 Claims, 4 Drawing Sheets

(56) References Cited

FOREIGN PATENT DOCUMENTS

| | | | |
|---|---|---|---|
| CN | 110502874 | A | 11/2019 |
| CN | 112052461 | A | 12/2020 |
| CN | 112115427 | A | 12/2020 |
| CN | 113569269 | A | 10/2021 |

* cited by examiner

OBFUSCATED CODE ENCRYPTION METHOD AND APPARATUS, AND DEVICE AND READABLE STORAGE

CROSS REFERENCE TO RELEVANT APPLICATIONS

The present application claims the priority of the Chinese patent application filed on Sep. 23, 2021 before the Chinese Patent Office with the application number of CN202111116879.2 and the title of "OBFUSCATED CODE ENCRYPTION METHOD AND APPARATUS, AND DEVICE AND READABLE STORAGE", which is incorporated herein in its entirety by reference.

TECHNICAL FIELD

The present application relates to the technical field of computers and communication and, more particularly, to a method for encryption of obfuscation code, an apparatus, a device and a readable medium.

BACKGROUND

With the rapid development of the technique of Internet clients, various technologies of the clients are more and more rich, and functions of the clients are more and more complex. However, because client codes are running on user terminals, attackers very easily read, analyze and crack them, which brings various risks to the system.

Obfuscated code is also known as junk code, and is an action that converts the code of a computer program into a form that is functionally equivalent but difficult to read and comprehend. Obfuscation code may be used for program source codes, and may also be used for intermediate codes obtained by program compiling, and obfuscation encryption may also be performed to the codes of binary files whose compilation is completed. The program executing the obfuscation code is referred to as a code obfuscater.

In the market, various code-obfuscation tools are commonly used to protect software products from being decompiled and cracked, to protect the intellectual property rights of the software, and are being paid increasingly more attention to. Currently, there are many code obfuscaters that have different functions, including: modifying the names of the various elements in the code, for example, the variables, the functions and the classes, into meaningless names, for example, rewriting into a single letter, or a brief meaningless letter combination, or even a symbol such as "_", whereby the reader cannot guess their uses according to the names; rewriting the logical parts in the code, to change them into a form that is functionally equivalent but more difficult to comprehend, for example, modifying the for circulation (a loop statement in the programming language) into the while circulation (another loop statement in the programming language), rewriting circulation into a recursive or reduced intermediate variable, and so on; and disorganizing the format of the code, for example, deleting the blanks, compressing multiple lines of the code into one line, breaking one line of the code into multiple lines, and so on.

In the existing code-obfuscation solutions, the original flow may be obtained by general analyzing means, and thus be cracked.

SUMMARY

In the first aspect, an embodiment of the present application provides a method for encryption of obfuscation code, wherein the method includes the following steps: obtaining position information of all of function codes in a to-be-encrypted program; based on the position information, determining, one by one, whether a skipping instruction exists in the corresponding function code; when the skipping instruction exists in one of the function codes, saving the skipping instruction and corresponding address information into a decryption datum body, and replacing the skipping instruction with a breakpoint instruction; and in response to execution of the preceding one step being completed for all of the function codes, based on the decryption datum body and an encrypted program obtained by replacing the instructions, generating an encrypted file.

In some embodiments, the method for encryption of obfuscation code further includes: obtaining the encrypted program by using the encrypted file, and executing the encrypted program; in response to executing the breakpoint instruction, based on the decryption datum body, obtaining the corresponding skipping instruction; and based on the skipping instruction, continuing to execute the encrypted program.

In some embodiments, the step of, based on the skipping instruction, continuing to execute the encrypted program includes: replacing the breakpoint instruction with the corresponding skipping instruction and executing the corresponding skipping instruction, to skip to a corresponding region of the encrypted program; and replacing the corresponding skipping instruction with the breakpoint instruction, and based on the corresponding region, continuing to execute the encrypted program.

In some embodiments, the method for encryption of obfuscation code further includes: obtaining a to-be-encrypted file, and checking the to-be-encrypted file to determine whether a file header, a program header table and a section header table of the to-be-encrypted file are valid; and in response to the file header, the program header table and the section header table of the to-be-encrypted file being valid, based on the to-be-encrypted file, obtaining the to-be-encrypted program.

In some embodiments, obtaining the position information of all of the function codes in the to-be-encrypted program includes: obtaining a symbol list in a section header table of the to-be-encrypted program, traversing the symbol list, and, based on a symbol type, determining whether a corresponding code is a function; and when the corresponding code is the function code, recording address information and size information of the function code.

In some embodiments, based on the position information, determining, one by one, whether the skipping instruction exists in the corresponding function code includes: based on the position information, traversing the corresponding function codes one by one, to determine whether the skipping instruction exists; when the skipping instruction does not exist, further determining whether traversing the function codes is completed; and when traversing the function codes is not completed, continuing to determine whether the skipping instruction exists in the function code.

In some embodiments, the method for encryption of obfuscation code further includes: when traversing the function codes is completed, continuing to determine whether the skipping instruction exists in a next function code.

In the second aspect, an embodiment of the present application provides an apparatus for encryption of obfuscation code includes: a first module configured for obtaining position information of all of function codes in a to-be-encrypted program; a second module configured for, based on the position information, determining, one by one, whether a skipping instruction exists in the corresponding function code; a third module configured for, when the skipping instruction exists in one of the function codes, saving the skipping instruction and corresponding address information into a decryption datum body, and replacing the skipping instruction with a breakpoint instruction; and a fourth module configured for, in response to execution of the step of the third module being completed for all of the function codes, based on the decryption datum body and an encrypted program obtained by replacing the instructions, generating an encrypted file.

In the third aspect, an embodiment of the present application provides a computer device, wherein the computer device includes a memory and one or more processors, the memory stores a computer-readable instruction, and the computer-readable instruction, when executed by the one or more processors, causes the one or more processors to implement the steps of the method for the encryption of the obfuscation code according to any one of the above embodiments.

In the fourth aspect, an embodiment of the present application provides one or more non-volatile computer-readable storage mediums storing a computer-readable instruction, wherein the computer-readable instruction, when executed by one or more processors, causes the one or more processors to implement the steps of the method for the encryption of the obfuscation code according to any one of the above embodiments.

BRIEF DESCRIPTION OF THE DRAWINGS

In order to more clearly illustrate the technical solutions of the embodiments of the present application or the related art, the figures that might be involved in the embodiments or the relevant description will be briefly described below. Apparently, the figures that are described below merely involve some embodiments of the present application, and a person skilled in the art may obtain other embodiments according to these figures without paying creative work.

DETAILED DESCRIPTION

In order to make the technical solutions and the advantages of the present application clearer, the embodiments of the present application will be described in further detail with reference to the embodiments and the drawings.

It should be noted that all of the expressions using "first" and "second" in the embodiments of the present application are intended to distinguish two different entities or different parameters that have the same names. It may be seen that "first" and "second" are merely for the convenience of the expression, and should not be construed as a limitation on the embodiments of the present application, which will not be explained in detail in the subsequent embodiments.

Figure 1:
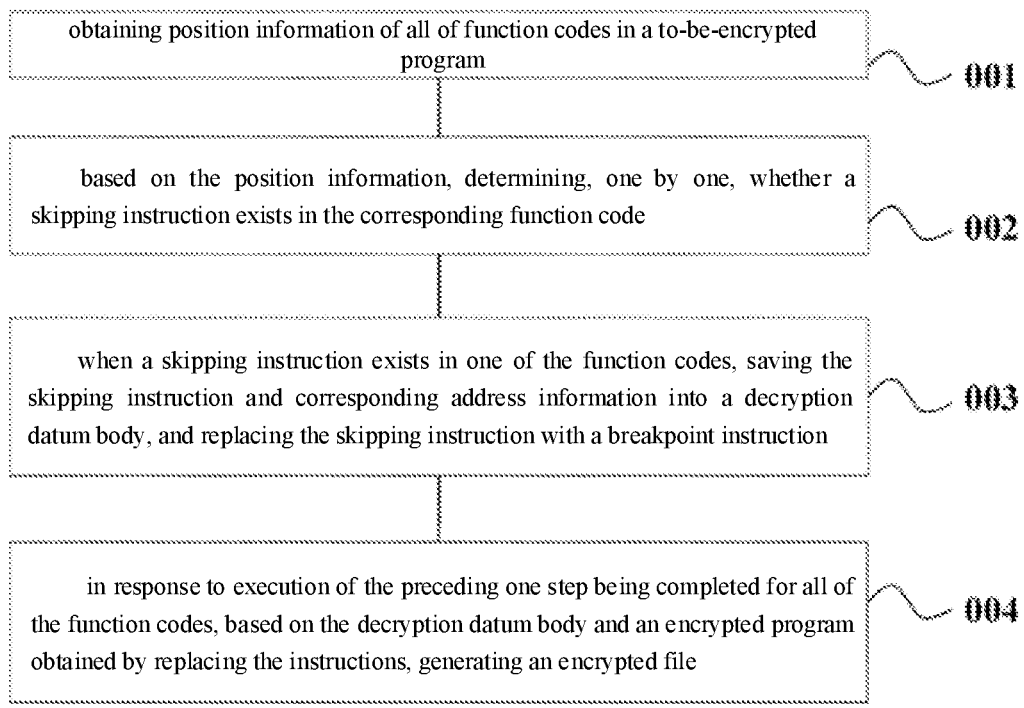
FIG. 1 is a schematic diagram of an embodiment of a method for encryption of obfuscation code according to one or more embodiments.

In the first aspect, an embodiment of the present application provides a method for encryption of obfuscation code. FIG. 1 shows a schematic diagram of the method for encryption of obfuscation code according to an embodiment of the present application. As shown in FIG. 1, the method for the encryption of the obfuscation code according to an embodiment of the present application may include the following steps:

001: obtaining position information of all of function codes in a to-be-encrypted program;

002: based on the position information, determining, one by one, whether a skipping instruction exists in the corresponding function codes;

003: when the skipping instruction exists in one of the function codes, saving the skipping instruction and corresponding address information into a decryption datum body, and replacing the skipping instruction with a breakpoint instruction; and

004: in response to execution of the preceding one step being completed for all of the function codes, based on the decryption datum body and an encrypted program obtained by replacing the instructions, generating an encrypted file.

In the embodiment shown in FIG. 1, the dynamic-debugging technique and the code-obfuscation technique are combined, and the dynamic-debugging technique is utilized to realize the dynamic encryption and decryption of the code. In an aspect, the original program flow may be disassembled, so that, in order to perform the program reversal, one must completely track the flow of the program execution, or crack and decrypt the module code and the datum body, to perform manual instruction replacement, which may greatly increase the difficulty in the reversal, to protect the program from being easily cracked. In another aspect, the program that is added the dynamic debugging cannot be added a second dynamic-debugging tool, which, at this level, realizes the effect of anti-debugging to a certain extent.

The embodiment shown in FIG. 1 involves the main confusion-tool body and the part of the decrypting module after the obfuscation encryption. The main confusion-tool body includes a code-obfuscation-engine module, which serves for reading the program file, extracting the key information, and performing obfuscation encryption to the program. The code-obfuscation-engine module includes an instruction identifying engine and an original decrypting engine. The instruction identifying engine serves for identifying the binary code of the file, and converting into an assembly instruction for analysis and processing. The original decrypting engine includes an obfuscated program that is pre-defined, contains the complete decrypting flow and is for dynamic encryption and decryption. The part of the decrypting module after the obfuscation encryption includes a decrypting engine, the decryption datum body and the obfuscated program.

In some embodiments, the step 003 in FIG. 1 includes: in response to a skipping instruction existing in the function code, saving the skipping instruction and the corresponding address information into a decryption datum body, and replacing the skipping instruction with the breakpoint instruction.

Figure 2:
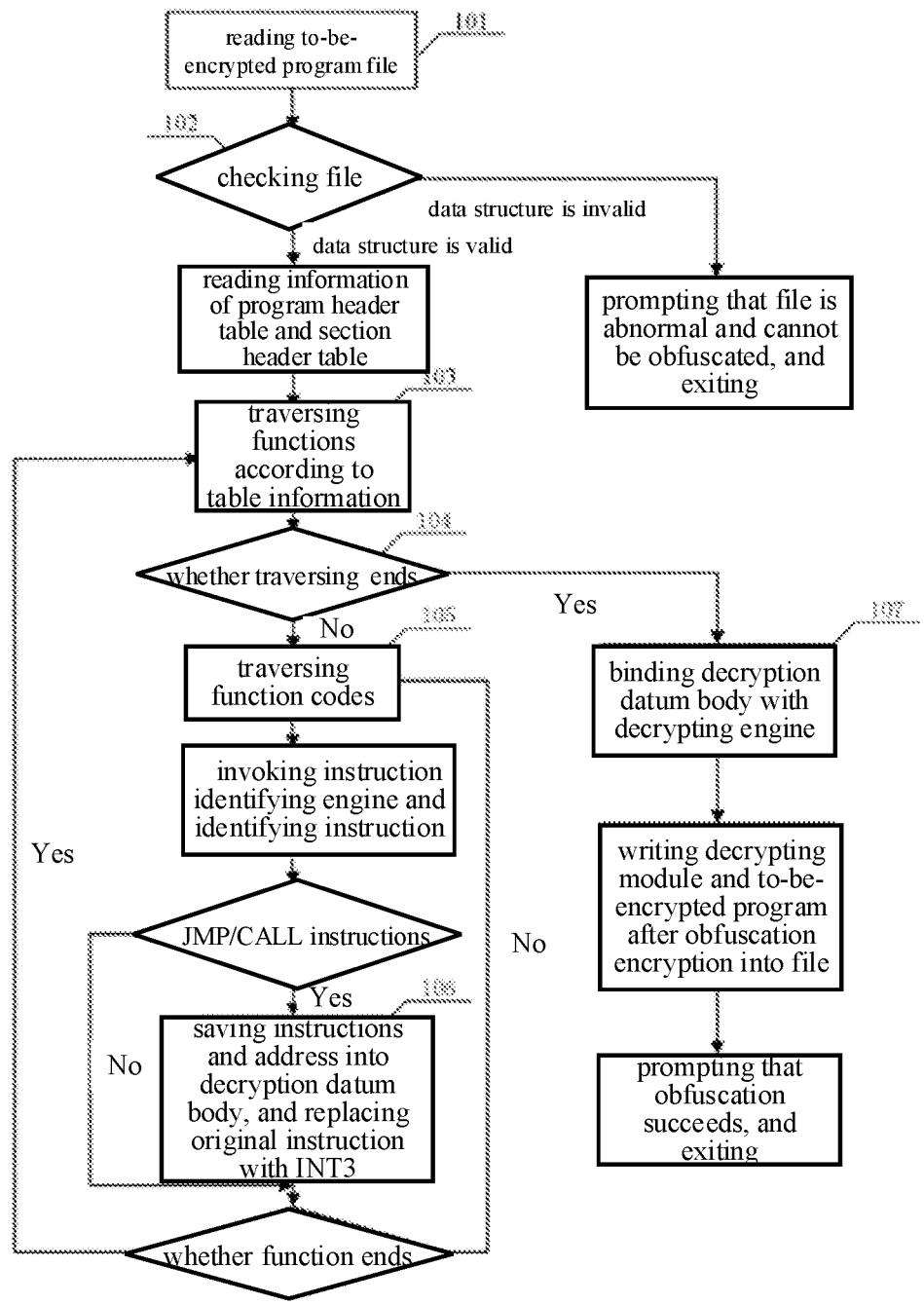
FIG. 2 is an operation flow chart of an embodiment of a method for encryption of obfuscation code according to one or more embodiments.

FIG. 2 shows an operation flow chart of the method for the encryption of the obfuscation code according to an embodiment of the present application. As shown in FIG. 2, in the present embodiment, the operation flow includes:

Step 101: reading a to-be-encrypted program file. The to-be-encrypted program file may be specified by the user.

Step 102: checking the file. The checking the file refers to checking the to-be-encrypted program file. The step 102 mainly includes checking the file structure and the header structure. The header structure includes the file header, the program header table and the section header table. The file header and the section header table are the two mostly used parts. Regarding the section header table, it is merely required to check whether it is valid. That is because some of the programs are specified with the parameters in compilation, which may remove the section header tables in the programs, whereby the section header tables cannot be used to know and traverse the functions and the codes thereof in the programs, and therefore cannot be used for obfuscation. Therefore, it is required to be strictly checked.

Step 103: traversing the functions according to the table information. After checking and reading the information of the section header table (may also be referred to as the table information), looking up and searching is performed in the data of the section header table, which is mainly looking up and searching the symbol table .symtab section in the section header table, thereby a file symbol (generally pointing to functions, global variables and so on) list is obtained; and subsequently, by traversing the file-symbol list, and checking the symbol type, whether it is a function is determined, and when it is a function, then the information of address and size of the symbol are obtained, thereby the position of the code of the function in the file is obtained.

Step 104: determining whether the traversing ends. The step 104 cooperates with the step 103. The determining whether the traversing ends may be understood as determining whether traversing the file-symbol list is completed.

When the traversing ends, i.e., traversing the file-symbol list is completed, then the step 107 is executed; and when the traversing does not end, i.e., traversing the file-symbol list is not completed, then the flow of traversing obfuscation is continued to be performed, and the step 105 is started to be executed.

Step 105: traversing the function code. After obtaining the position of the function code in the file in the step 103, the corresponding position is skipped to, the code of the function is traversed by using one circulation, wherein the ending condition is that the traversing comes to the end of the function, in other words, the information of the address and the size of the function are obtained. The step 105 and the flow of the "invoking the instruction identifying the engine and identifying the instruction" in FIG. 2 cooperate with each other. After it skips to the beginning of the function, it is required to transmit the pointer to the identifying engine, and the identifying engine determines how many bytes of the datum are required to be read, and determines what instruction it is. Because the instructions have unequal lengths, the shorter instructions have merely 1 byte, while the longer instructions might contain address operands and so on. After a complete instruction is read and determined, the pointer may move to the position of the beginning of the next instruction. It may be determined whether the identified instruction is a skipping instruction JMP or a CALL instruction, and the step 106 and so on may be executed according to the result of the determination.

Step 106: saving the instructions and the address into the decryption datum body, and replacing the instruction with INT3. When the identified instruction is a skipping instruction JMP or a CALL instruction, the step 106 is executed. The step 106 includes saving the information of the original instruction, such as the address, the instruction type and the original instruction content, into a datum body (i.e., the decryption datum body), and subsequently replacing the original instruction with INT3, wherein INT3 is a breakpoint instruction. The breakpoint instruction may be intercepted by the system when being executed, subsequently turns over the control authority to the dynamic-debugging tool, which is the decrypting module in the present solution, is decrypted and subsequently executed by the decrypting module, and is re-encrypted after the execution.

Step 107: binding the decryption datum body with the decrypting engine. After the traversing obfuscation is completed, the pre-defined decrypting module is bound to the datum body that saves the complete obfuscation information, i.e., the decryption datum body, and subsequently written into a file together with the program file protected by the obfuscation encryption, this file is the protected program. Accordingly, the binding between the decryption datum body and the decrypting engine is completed. Subsequently, according to demands, it may be prompted that the obfuscation succeeds, and the flow may exit.

In some embodiments of the present application, the method for the encryption of the obfuscation code further includes: obtaining the encrypted program by using the encrypted file, and executing the encrypted program; in response to executing the breakpoint instruction, based on the decryption datum body, obtaining the corresponding skipping instruction; and based on the skipping instruction, continuing to execute the encrypted program.

Figure 3:
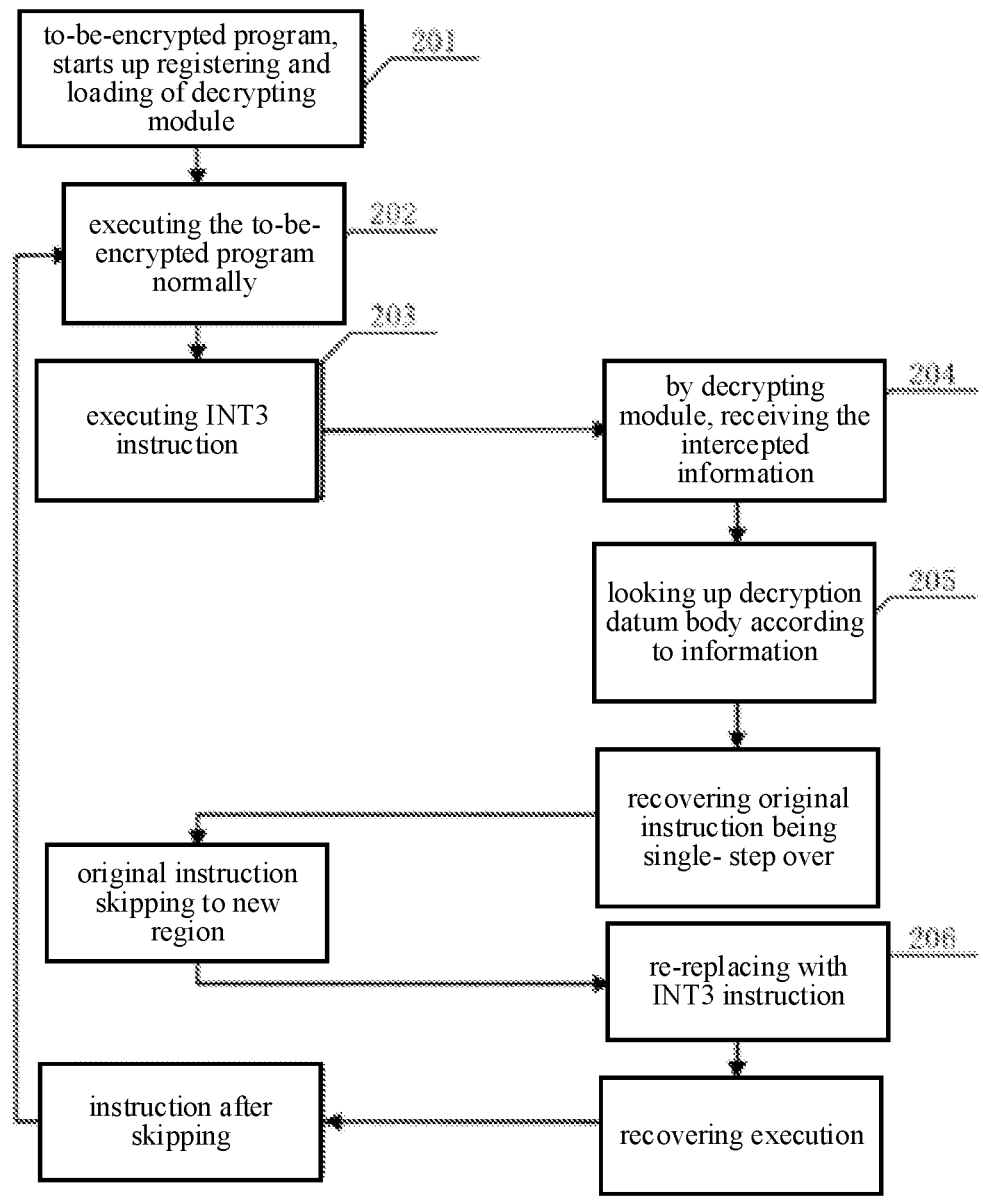
FIG. 3 is an operation flow chart of an embodiment of a method for encryption of obfuscation code according to one or more embodiments.

In the present embodiment, when the to-be-encrypted program is executed, the dynamic-debugging technique is used to perform dynamic decryption and encryption, to ensure the safety while normally executing the program. FIG. 3 shows an operation flow chart of the method for the encryption of the obfuscation code according to an embodiment of the present application. As shown in FIG. 3, the operation flow includes:

Step 201: the to-be-encrypted program starts up the registering and the loading of the decrypting module. When the program is started up, the decrypting module is started up in preference to the to-be-encrypted program, to complete the operations such as the environment initialization and the configuring of the dynamic-debugging environment, and subsequently creates a sub-process and starts up the to-be-encrypted program. The decrypting module performs dynamic debugging to the sub-process of the to-be-encrypted program in the form of a parent process.

Step 202: executing the to-be-encrypted program normally. Most of the original codes of the to-be-encrypted program are not modified, and may be normally executed.

Step 203: executing the INT3 instruction. Because all of the skipping instructions JMP and the CALL instructions in the program are replaced, when the instructions are executed, they are intercepted by the replaced breakpoint instruction INT3, and subsequently the system transfers the executive authority to the dynamic-debugging tool, which is the decrypting module as the parent process in the present solution.

Step 204: by the decrypting module, receiving the intercepted information. When the system turns over the control authority to the decrypting module, it transmits the information of the breakpoint instruction together to the module, and therefore the decrypting module may obtain the information relevant to the instruction, for example, the address and so on.

Step 205: looking up the decryption datum body according to the information. Subsequently, the decrypting module, according to the information (mainly the address offset and so on), enters the decryption datum body and looks up, to find the original instruction information corresponding to the address, and subsequently replaces the INT3 instruction with the original instruction, to realize dynamic decryption. After the replacement, the instruction is executed by using a single-step over function, to cause the to-be-encrypted program to be normally executed to the next region, and maintain the control authority of the decrypting module.

Step 206: re-replacing with the INT3 instruction. After the execution, the decrypting module re-replaces the original instruction with the INT3 breakpoint instruction, to realize dynamic encryption. Subsequently, the decrypting module transfers the control authority back to the to-be-encrypted program, which has executed to the new region that is pointed to by the skipping instruction JMP and the CALL instruction. The to-be-encrypted program, after obtaining the control authority, may be normally executed, till the INT3 skipping instruction is encountered the next time and this flow is executed again.

In some embodiments of the present application, based on the skipping instruction, continuing to execute the encrypted program includes: replacing the breakpoint instruction with the corresponding skipping instruction and executing the corresponding skipping instruction, to skip to a corresponding region of the encrypted program; and replacing the corresponding skipping instruction with the breakpoint instruction, and based on the corresponding region, continuing to execute the encrypted program.

In some embodiments of the present application, the method for the encryption of the obfuscation code further includes: obtaining a to-be-encrypted file, and checking the to-be-encrypted file to determine whether a file header, a program header table and a section header table of the to-be-encrypted file are valid; and in response to the file header, the program header table and the section header table of the to-be-encrypted file being valid, based on the to-be-encrypted file, obtaining the to-be-encrypted program.

In some embodiments, obtaining the position information of all of the function codes in the to-be-encrypted program includes: obtaining a symbol list in a section header table of the to-be-encrypted program, traversing the symbol list, and, based on a symbol type, determining whether a corresponding code is a function; and when the corresponding code is the function code, recording address information and size information of the function code.

In some embodiments, obtaining the position information of all of the function codes in the to-be-encrypted program includes: obtaining a symbol list in a section header table of the to-be-encrypted program, traversing the symbol list, and, based on a symbol type, determining whether a corresponding code is a function; and when the corresponding code is the function code, recording address information and size information of the function code. When the corresponding code is a function code, recording the address information and the size information of the function code includes: in response to the corresponding code being the function code, recording address information and size information of the function code.

In some embodiments, the step of, based on the position information, determining, one by one, whether a skipping instruction exists in the corresponding function codes includes: based on the position information, traversing the corresponding function codes one by one, to determine whether the skipping instruction exists; if the skipping instruction does not exist, further determining whether traversing the function codes is completed; and if traversing the function codes is not completed, continuing to determine whether the skipping instruction exists in the function code.

In some embodiments, based on the position information, determining, one by one, whether a skipping instruction exists in the corresponding function codes includes: based on the position information, traversing the corresponding function codes one by one, to determine whether a skipping instruction exists; when the skipping instruction does not exist, further determining whether the step of traversing the function codes is completed; and when the step of traversing the function codes is not completed, continuing to determine whether the skipping instruction exists in the function code.

When the skipping instruction does not exist, further determining whether traversing the function codes is completed includes: in response to no skipping instruction existing, further determining whether the step of traversing the function codes is completed. When the step of traversing the function codes is not completed, continuing to determine whether a skipping instruction exists in the function code includes: in response to the step of traversing the function codes being not completed, continuing to determine whether a skipping instruction exists in the function code.

In some embodiments of the present application, the method further includes: when the step of traversing the function codes is completed, continuing to determine whether a skipping instruction exists in a next the function code.

In the method for the encryption of the obfuscation code, the dynamic-debugging technique is fused into the obfuscation code, the original program flow is disassembled by instruction replacement, and the program protected by encryption is allowed to dynamically restore and disassemble the code in operation, which may effectively prevent the problem that the cracker saves the complete program code to result in the cracking of the program. In the method according to the embodiments of the present application, the original flow cannot be obtained by general analyzing means, and is recovered and re-obfuscated in real time by the dynamic-debugging technique in operation, and therefore it is possible to find the original flow only by wholly tracking each of the steps of the flow of the program execution. That greatly increases the strength of the encrypted protection, and increases the cost in cracking, thereby improving the safety of the program.

It should be particularly noted that, if reasonable, some of the steps of the method for the encryption of the obfuscation code according to the above embodiments may be mutually mixed, replaced, added or deleted. Therefore, those reasonable arrangements, combinations and variations of the method for the encryption of the obfuscation code should also fall within the protection scope of the present application, and the protection scope of the present application should not be limited to the embodiments.

Figure 4:
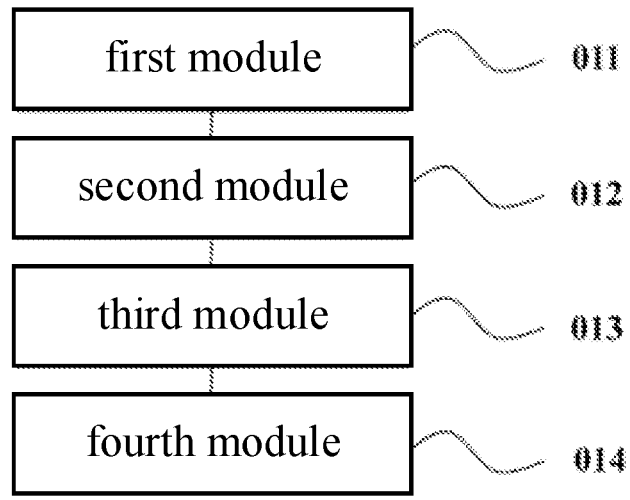
FIG. 4 is a schematic diagram of an embodiment of an apparatus for encryption of obfuscation code according to one or more embodiments.

In the second aspect, an embodiment of the present application provides an apparatus for encryption of obfuscation code. FIG. 4 is a schematic diagram of the apparatus for the encryption of the obfuscation code according to an embodiment of the present application. As shown in FIG. 4, the apparatus for the encryption of the obfuscation code according to an embodiment of the present application includes the following modules:

a first module 011 configured for obtaining position information of all of function codes in a to-be-encrypted program;

a second module 012 configured for, based on the position information, determining, one by one, whether a skipping instruction exists in the corresponding function code;

a third module 013 configured for, when the skipping instruction exists in one of the function codes, saving the skipping instruction and corresponding address information into a decryption datum body, and replacing the skipping instruction with a breakpoint instruction; and a fourth module 014 configured for, in response to the execution of the step of the third module being completed for all of the function codes, based on the decryption datum body and an encrypted program obtained by replacing the instructions, generating an encrypted file.

Figure 5:
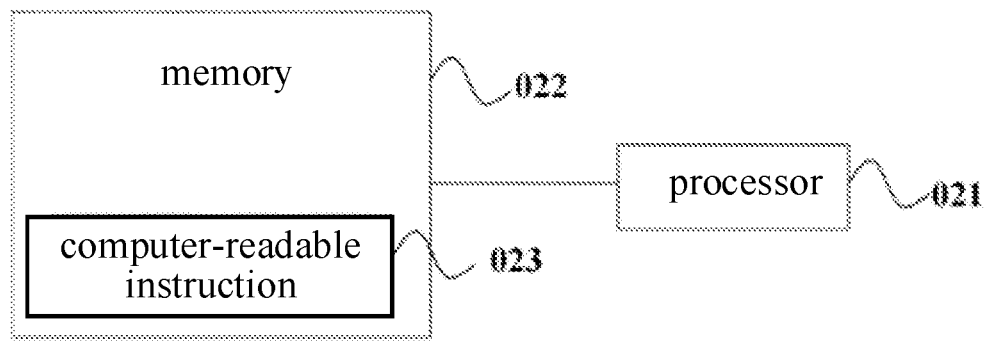
FIG. 5 is a schematic diagram of an embodiment of a computer device according to one or more embodiments.

In the third aspect, an embodiment of the present application provides a computer device. FIG. 5 is a schematic diagram of the computer device according to an embodiment of the present application. As shown in FIG. 5, the computer device according to the embodiment of the present application includes one or more processors 021 and a memory 022. The memory 022 stores a computer-readable instruction 023, and the computer-readable instruction 023, when executed by the one or more processors 021, causes the one or more processors 021 to implement the steps of the method for the encryption of the obfuscation code according to any one of the above embodiments.

Figure 6:
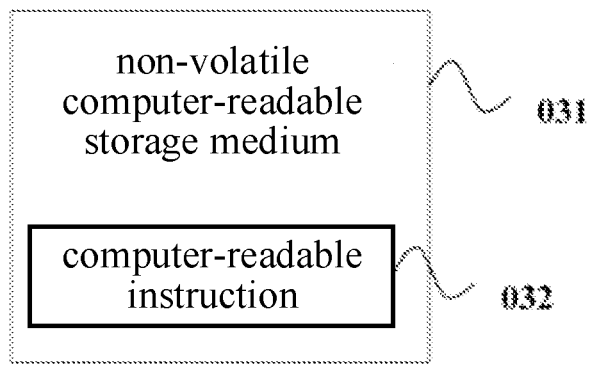
FIG. 6 is a schematic diagram of a non-volatile computer-readable storage medium according to one or more embodiments.

In the fourth aspect, an embodiment of the present application provides one or more non-volatile computer-readable storage mediums storing a computer-readable instruction. FIG. 6 shows a schematic diagram of the non-volatile computer-readable storage medium. As shown in FIG. 6, the non-volatile computer-readable storage medium 031 stores a computer-readable instruction 032, and the computer-readable instruction 032, when executed by one or more processors, causes the one or more processors to implement the steps of the method for encryption of obfuscation code according to any one of the above embodiments.

Finally, it should be noted that a person skilled in the art may understand that all or some of the processes of the methods according to the above embodiments may be implemented by a computer-readable instruction instructing relative hardware to complete, the computer-readable instruction of the method for the encryption of the obfuscation code may be stored in a computer-readable storage medium, and the computer-readable instruction, when executed, may implement the steps of the method for the encryption of the obfuscation code according to any one of the above embodiments. The computer-readable storage medium may be a diskette, an optical disk, a read-only memory (ROM), a random access memory (RAM) and so on. The embodiments of the computer-readable instruction may reach an effect the same as or similar to those of any of the above-described embodiments of the method for the encryption of the obfuscation code corresponding thereto.

Furthermore, the steps of the method for the encryption of the obfuscation code and the system units may also be implemented by using a controller and a computer-readable storage medium that is used to store a computer-readable instruction enabling the controller to execute the functions of the steps or units.

A person skilled in the art should also understand that various illustrative logical blocks, modules, electric circuits and algorithm steps described with reference to the disclosure herein may be implemented as electronic hardware, computer software or a combination thereof. In order to clearly explain the interchangeability between the hardware and the software, it has be described generally with reference to the functions of various illustrative components, blocks, modules, electric circuits and steps. Whether those functions are implemented as software or hardware depends on the applications and the design constraints exerted on the entire system. A person skilled in the art may employ different modes to implement the functions with respect to each of the applications, but those implementation decisions should not be considered as leading to departing from the scope disclosed by the embodiments of the present application.

In one or more exemplary configurations, the functions may be implemented in hardware, software, firmware or any combination thereof. When implemented in software, the functions may be stored in a computer-readable medium as one or more instructions or codes or transmitted via a computer-readable medium. The computer-readable medium includes a computer storage medium and a communication medium, wherein the communication medium includes any medium that facilitates to transmit the computer program from one location to another location. The storage medium may be any usable medium that may be accessed by a generic or dedicated computer. As an example rather than limitative, the computer-readable medium may include an RAM, an ROM, an EEPROM, a CD-ROM or another optical-disk storage device, and a magnetic-disk storage device or another magnetic storage device, or is any other medium that may be used to carry or store a program code in the form of an instruction or required by the data structure and may be accessed by a generic or dedicated computer or a generic or dedicated processor. Furthermore, any connection may be suitably referred to as a computer-readable medium. For example, when a coaxial cable, an optical-fiber cable, a twisted pair, a digital subscriber line (DSL) or a wireless technique such as infrared, radio and microwave is used to send software from a website, a server or another remote source, then all of the coaxial cable, the optical-fiber cable, the twisted pair, the DSL or the wireless technique such as infrared, radio and microwave are encompassed within the definition of the medium. As used herein, the magnetic disk and the optical disk include a compact disk (CD), a laser disk, an optical disk, a digital video disk (DVD), a floppy disk and a blue-ray disk, wherein the magnetic disk usually magnetically reproduces data, and the optical disk optically reproduces data by using laser. The combination of the above contents should also be encompassed within the scope of the computer-readable medium.

The illustrative embodiments disclosed by the present application are described above. However, it should be noted that many variations and modifications may be made without departing from the scope of the embodiments of the present application defined by the claims. The functions, steps and/or acts of the process claims according to the disclosed embodiments described herein are not required to be implemented in any sequence. Furthermore, although the elements of the embodiments of the present application may be described or claimed in a singular form, unless explicitly limited as singular, they may also be comprehended as plural.

It should be understood that, as used herein, unless the context clearly supports an exception, the singular form "a" is intended to encompass a plural form. It should also be understood that, as used herein, the "and/or" refers to including any and all feasible combinations of one or more relatively listed items.

A person skilled in the art may understand that all or some of the steps for implementing the above embodiments may be completed by hardware, and may also be completed by using a computer-readable instruction to instruct relevant hardware. The computer-readable instruction may be stored in a computer-readable storage medium. The computer-readable storage medium may be a read-only memory, a magnetic disk, an optical disk and so on.

A person skilled in the art should understand that the discussion on any of the above embodiments is merely illustrative, and are not intended to imply that the scope (including the claims) of the embodiments of the present application is limited to those examples. With the thinking of the embodiments of the present application, the embodiments or the technical features of different embodiments may be combined, and many other variations of different aspects of the embodiments of the present application as stated above may exist, which are not provided in detail for brevity. Therefore, any omissions, modifications, equivalent substitutions and improvements that are made within the spirit and the principle of the embodiments of the present application should fall within the protection scope of the embodiments of the present application.

The invention claimed is:

1. A method for encryption of obfuscation code, comprising:
    obtaining position information of all of function codes in a to-be-encrypted program;
    based on the position information, determining, one by one, whether a skipping instruction exists in the corresponding function code;
    when the skipping instruction exists in one of the function codes, saving the skipping instruction and corresponding address information into a decryption datum body, and replacing the skipping instruction with a breakpoint instruction; and
    in response to execution of invoking instruction, identifying engine, and identifying instruction being completed for all of the function codes, based on the decryption datum body and an encrypted program obtained by replacing the instructions, generating an encrypted file.

2. The method for the encryption of the obfuscation code according to claim 1, wherein the method further comprises:
    obtaining the encrypted program by using the encrypted file, and executing the encrypted program;
    in response to executing the breakpoint instruction, based on the decryption datum body, obtaining the corresponding skipping instruction; and
    based on the skipping instruction, continuing to execute the encrypted program.

3. The method for the encryption of the obfuscation code according to claim 2, wherein based on the skipping instruction, continuing to execute the encrypted program comprises:
    replacing the breakpoint instruction with the corresponding skipping instruction and executing the corresponding skipping instruction, to skip to a corresponding region of the encrypted program; and
    replacing the corresponding skipping instruction with the breakpoint instruction, and based on the corresponding region, continuing to execute the encrypted program.

4. The method for the encryption of the obfuscation code according to claim 1, wherein the method further comprises:
    obtaining a to-be-encrypted file, and checking the to-be-encrypted file to determine whether a file header, a program header table and a section header table of the to-be-encrypted file are valid; and
    in response to the file header, the program header table and the section header table of the to-be-encrypted file being valid, based on the to-be-encrypted file, obtaining the to-be-encrypted program.

5. The method for the encryption of the obfuscation code according to claim 1, wherein obtaining the position information of all of the function codes in the to-be-encrypted program comprises:
    obtaining a symbol list in a section header table of the to-be-encrypted program, traversing the symbol list, and, based on a symbol type, determining whether a corresponding code is a function; and
    when the corresponding code is the function code, recording address information and size information of the function code.

6. The method for the encryption of the obfuscation code according to claim 1, wherein based on the position information, determining, one by one, whether the skipping instruction exists in the corresponding function code comprises:
    based on the position information, traversing the corresponding function codes one by one, to determine whether the skipping instruction exists;
    when the skipping instruction does not exist, further determining whether the step of traversing the function codes is completed; and
    when the step of traversing the function codes is not completed, continuing to determine whether the skipping instruction exists in the function code.

7. The method for the encryption of the obfuscation code according to claim 6, wherein the method further comprises:
    when the step of traversing the function codes is completed, continuing to determine whether the skipping instruction exists in a next function code.

8. The method for the encryption of the obfuscation code according to claim 1, wherein the corresponding address information comprises address offset.

9. The method for the encryption of the obfuscation code according to claim 1, wherein the breakpoint instruction is intercepted by the system when being executed.

10. The method for the encryption of the obfuscation code according to claim 1, wherein when the skipping instruction exists in one of the function codes, the method further comprises:
    saving an instruction type of the skipping instruction and content of the skipping instruction into the decryption datum body.

11. The method for the encryption of the obfuscation code according to claim 3, wherein after replacing the corresponding skipping instruction with the breakpoint instruction, the replaced instruction is executed by using a single-step over function.

12. The method for the encryption of the obfuscation code according to claim 5, wherein a symbol in the symbol list comprises: the function and a global variable.

13. A computer device, wherein the computer device comprises a memory and one or more processors, the memory stores a computer-readable instruction, and the computer-readable instruction, when executed by the one or more processors, causes the one or more processors to implement the steps of the method according to claim 1.

14. The computer device according to claim 13, wherein the method further comprises:
    obtaining the encrypted program by using the encrypted file, and executing the encrypted program;

in response to executing the breakpoint instruction, based on the decryption datum body, obtaining the corresponding skipping instruction; and based on the skipping instruction, continuing to execute the encrypted program.

15. The computer device according to claim 14, wherein based on the skipping instruction, continuing to execute the encrypted program comprises:

replacing the breakpoint instruction with the corresponding skipping instruction and executing the corresponding skipping instruction, to skip to a corresponding region of the encrypted program; and replacing the corresponding skipping instruction with the breakpoint instruction, and based on the corresponding region, continuing to execute the encrypted program.

16. The computer device according to claim 13, wherein the method further comprises:

obtaining a to-be-encrypted file, and checking the to-be-encrypted file to determine whether a file header, a program header table and a section header table of the to-be-encrypted file are valid; and in response to the file header, the program header table and the section header table of the to-be-encrypted file being valid, based on the to-be-encrypted file, obtaining the to-be-encrypted program.

17. The computer device according to claim 13, wherein obtaining the position information of all of the function codes in the to-be-encrypted program comprises:

obtaining a symbol list in a section header table of the to-be-encrypted program, traversing the symbol list, and, based on a symbol type, determining whether a corresponding code is a function; and when the corresponding code is the function code, recording address information and size information of the function code.

18. The computer device according to claim 13, wherein based on the position information, determining, one by one, whether the skipping instruction exists in the corresponding function code comprises:

based on the position information, traversing the corresponding function codes one by one, to determine whether the skipping instruction exists;

when the skipping instruction does not exist, further determining whether the step of traversing the function codes is completed; and when the step of traversing the function codes is not completed, continuing to determine whether the skipping instruction exists in the function code.

19. The computer device according to claim 18, wherein the method further comprises:

when the step of traversing the function codes is completed, continuing to determine whether the skipping instruction exists in a next function code.

20. A non-transitory computer-readable storage mediums storing a computer-readable instruction, wherein the non-transitory computer-readable instruction, when executed by one or more processors, causes the one or more processors to implement the steps of the method according to claim 1.

* * * * *